July 21, 1959     H. J. BLASKOWSKI     2,895,719
METHOD AND APPARATUS FOR RECUPERATIVE HEAT EXCHANGE
Filed Dec. 24, 1954     2 Sheets-Sheet 1
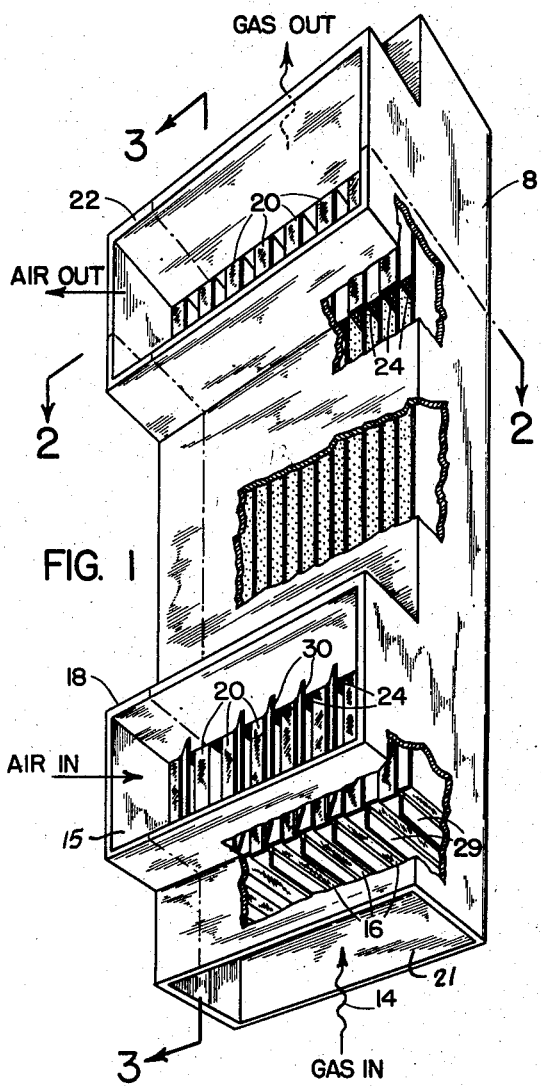
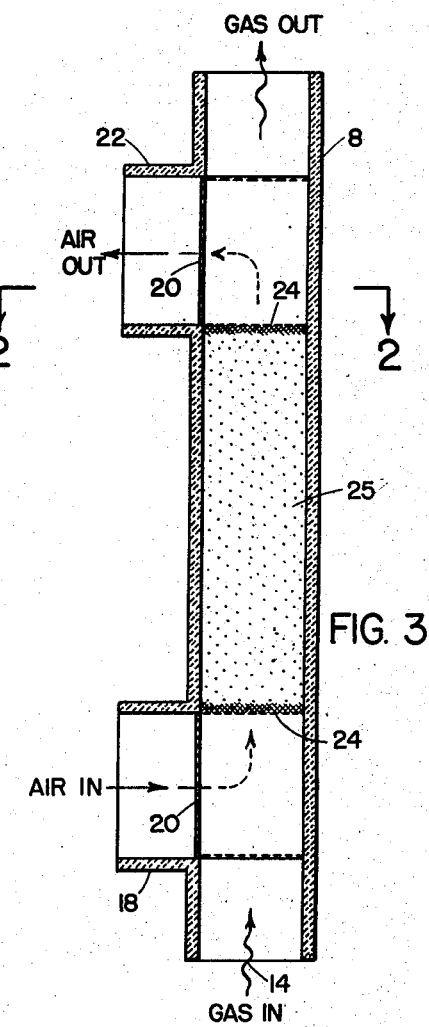
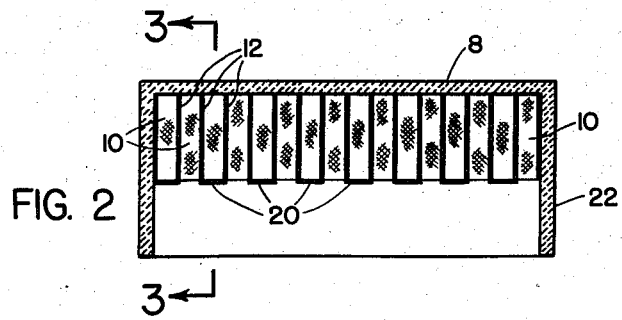
INVENTOR
HENRY J. BLASKOWSKI
BY Eldon H. Luther
ATTORNEY July 21, 1959 H. J. BLASKOWSKI 2,895,719
METHOD AND APPARATUS FOR RECUPERATIVE HEAT EXCHANGE
Filed Dec. 24, 1954 2 Sheets-Sheet 2
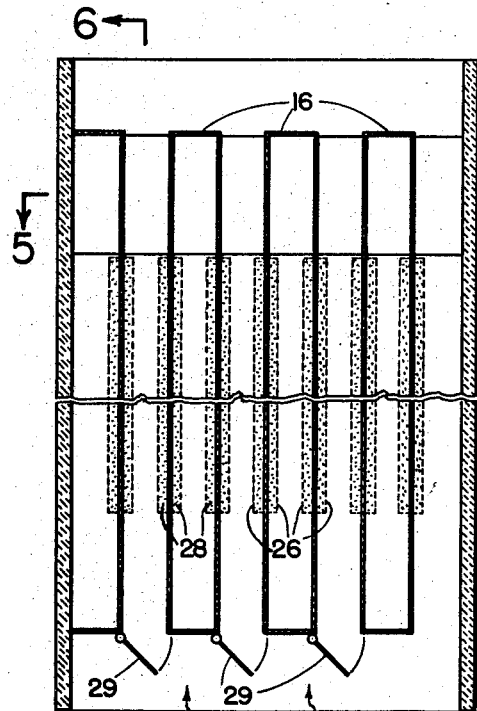
FIG. 7
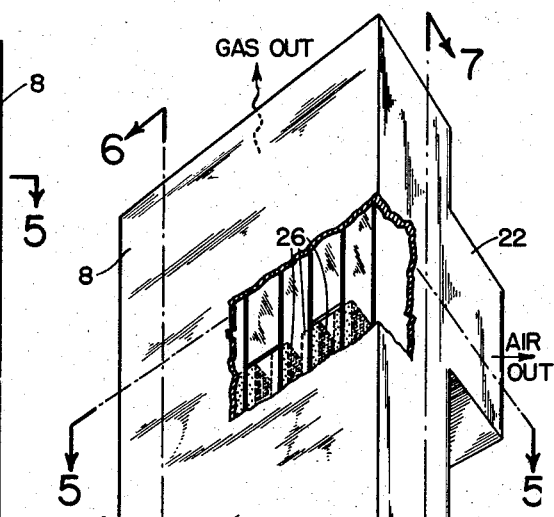
FIG. 4
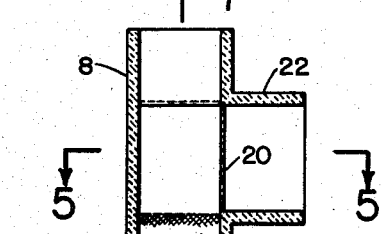
FIG. 6
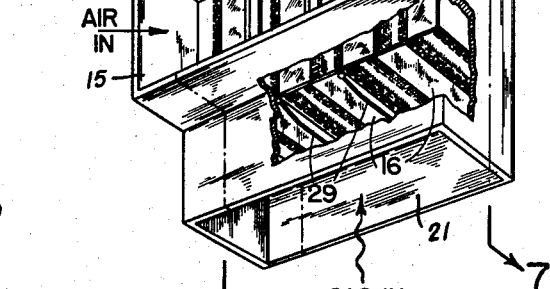
FIG. 5
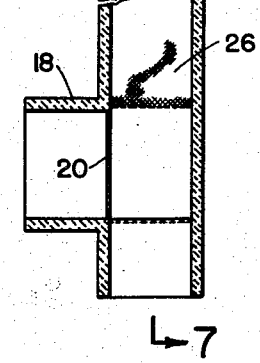
INVENTOR
HENRY J. BLASKOWSKI
BY
ATTORNEY

United States Patent Office 2,895,719
Patented July 21, 1959

---

2,895,719

METHOD AND APPARATUS FOR RECUPERATIVE HEAT EXCHANGE

Henry J. Blaskowski, New York, N.Y., assignor to Combustion Engineering, Inc., New York, N.Y., a corporation of Delaware Application December 24, 1954, Serial No. 477,482

4 Claims. (Cl. 257—245)

This invention relates to air heaters of the type wherein heat is indirectly transferred from a heating gas, such as hot combustion gases, to air through the medium of a metallic heat transfer wall which is contacted by the gas on one side and the air on the other, i.e., the invention relates to an air heater of the recuperative type and has specific relation to such an air heater embodying a fluidized medium.

In accordance with the present invention a stream of hot heating gas is passed in contact with the surface of a metallic wall which has a surface that is directly opposed to the first mentioned surface contacted by a stream of air to be heated with heat from the heating gases passing through the metallic wall and being picked up by or imparted to the air thereby raising the temperature of the air. Retained in engagement with each of the surfaces of this metallic wall is a body of discrete material which is maintained in a fluidized condition by the gas and air respectively, which is passed therethrough. As a result of this body of fluidized material being in contact with the surfaces of the wall the effective rate of heat exchange between the heating gases and the air is greatly increased thereby greatly increasing the capacity of the heat exchanger.

The technique of fluidization involves passing a gas through a body of discrete material at such a velocity that the body of material assumes an agitated state resembling a boiling liquid with the particles of the material moving rapidly within the mass and the mass being in what is termed a pseudo-liquid condition. When in this fluidized state the material is not carried along with the fluidizing gas and although the body of material is expanded so that it occupies considerably more volume than when in the non-fluidized state the fluidizing gas passes through the body of material and leaves the same at what is termed a disengaging zone. This type of fluidization is sometimes referred to as "dense phase" fluidization and it is to be understood that when the term fluidization is used throughout this application reference is had to this type of fluidization. When a body of discrete material is in this fluidized condition or state the body of material has many of the properties of a liquid and results in extremely high rates of heat transfer between the fluidizing gas and a heat exchange surface which is in contact with the fluidized material with these rates of heat exchange being in the order of 30 or 40 B.t.u./hr./sq. ft./° F. and above, with rates as high as 100 B.t.u./hr./sq. ft./° F. being obtainable depending upon the make up of the discrete material and the size of the particles thereof. However, the material must be fluidized to obtain these high rates of heat transfer and if the gas velocity is either too low or too high to produce fluidization these high rates will not be realized. In the present invention such a fluidized body or mass is employed in a novel manner to greatly increase the capacity of an air heater of the type wherein the air is heated by passing it in indirect heat exchange relation with a heating gas with the gas and air being separated by a heat transfer wall or surface.

It is an object of this invention to provide an improved recuperative type air heater embodying a fluidized medium.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein Figure 1 is a perspective view of a preferred embodiment of the novel air heater of this invention with portions thereof broken away to show interior construction details.

Figure 2 is a transverse sectional view taken along line 2—2 of Figures 1 and 3.

Figure 3 is a longitudinal sectional view taken along line 3—3 of Figures 1 and 2.

Figure 4 is a view similar to that of Figure 1 but showing a modified form of construction.

Figures 5, 6 and 7 are sectional views taken generally along the lines 5—5, 6—6 and 7—7 respectively, of Figure 4.

Referring now to the drawings, the preferred embodiment of the air heater of this invention depicted in Figs. 1, 2 and 3 comprises a housing 8 that is divided into numerous parallel vertically disposed, side by side passageways 10 by the partitions or division walls 12 with adjacent passageways having a common wall 12 disposed therebetween.

Hot gases, such as flue gases from a boiler, enter housing 8 through the bottom thereof as indicated by arrow 14 and pass upward through alternate passageways with every other passageway being sealed at its lower end by the end plates 16 to prevent entrance of these gases thereinto. Air is admitted to and passed upwardly through these alternate passageways that are restricted from the passage of combustion gases therethrough with this air entering the passageways through the inlet opening 18 provided in the side of housing 8. In order to prevent entrance of air into the passageways carrying the heating gases, the portion of these passages that lead into the inlet opening 18 are sealed from communication with this opening by the plates 20. The heating gases thus pass upwardly through alternate ones of the passageways 10 and are directed out the top of housing 8 while the remaining passageways have air directed upwardly therethrough with the air being directed through outlet 22 provided at the upper end of the housing. In order to maintain the heating gases and air segregated upon leaving the air heater the plates 16 and 20 are provided at the upper end of the passageways as well as at their lower ends.

Disposed within each of the passageways, intermediate the screens 24 provided therein is a mass or bed of discrete material 25 which is fluidized by the air and gas respectively that pass upwardly through the passageways and accordingly through the bed of material. The mesh of the screens 24 is such as to prevent passage of the discrete material therethrough while permitting passage of the heating gases and air.

In operation, prior to passage of the gas and air through the respective passageways 10 the discrete material 25 rests upon the lower of the screens 24 with the bed of material in the then so-called packed condition occupying considerably less than the full height of the passageways 10. Upon passage of the heating gas and air through their respective passageways 10, however, the discrete material becomes fluidized resulting in expanding the bed so it occupies substantially, although generally slightly less than, the full height of the passageways. Heat is then indirectly transferred from the heating gas to the air of adjacent passageways through the common wall 12. Because of the fluidized medium this rate of heat transfer through wall 12 is extremely high in comparison with heat transfer rates obtained with conventional type of heat exchange apparatus employed with gaseous fluids with rates as high as 100 B.t.u./hr./sq. ft./° F. being obtainable depending upon the make up of the discrete material and the size of the particles thereof.

Because of the extremely high rate of heat transfer between the gas and the air obtainable with the use of a fluidized medium the air heater of the present invention will be much smaller than air heaters of known design for the same capacity with the air heater of this invention thus being both more economical and more efficient.

The modified embodiment depicted in Figs. 4 through 7 is similar to that of Figs. 1, 2 and 3 except that the discrete material rather than occupying the total transverse section of the passageways 10 is retained in engagement with the common walls 12 by means of screens 26 which are spaced from and parallel with the wall 12. The edges of screen 26 are laterally bent and are connected with walls 12 so as to form an enclosed chamber or compartments 28 within which the discrete material is retained thereby retaining a relatively thin layer of the material in engagement with the surface of the wall.

Although screens 26 are sufficiently close to the walls 12 so that a portion of the passageways 10 are unobstructed, a portion of the heating gas and air flowing through the respective passageways 10 passes through the discrete material retained therewithin thereby fluidizing this material.

The embodiment of Figs. 4 through 7 is particularly well adapted for use when high gas and air velocities are encountered since the velocity of the gas and air passing through the discrete material 25 will be substantially lower than that passing through the unobstructed portion of the passageways and thus when high velocities prevail the velocity passing through the discrete material will not tend to exceed the upper limit which will result in fluidization. However, when the gas and air velocities are not especially high the embodiment of Figs 1 and 2 is preferable since all the gas and air passes through the discrete material and therefore the material will be fluidized at a much lower velocity than with the embodiment of Figs. 3 and 4.

Fluidization of a discrete material of a particular size occurs within a certain range of velocity of the fluidizing gas. The lower limit of this velocity is that at which fluidization is initiated while the upper limit of the velocity is that at which the material or a substantial portion thereof is carried along with the gas or in the illustrative organization shown the mass of material or a substantial portion thereof is picked up by the gas stream and is held against the upper screen 24. Within these upper and lower velocity limits the discrete material will be in a fluidized state as this is known in the art. In order to increase the range of gas and air velocities, respectively, entering the air heater with which the present invention may be employed, dampers 30 are provided at the inlets of a number of the passageways 10 through which the gas and air are respectively directed. By means of these dampers, which are individually operated, gas and air flow through any desired number of adjacent passageways 10 may be effectively restricted or prevented. Thus an air heater of either the Figs. 1, 2 and 3 embodiment or the Figs. 4 through 7 embodiment may be designed for the maximum gas and air velocities through ducts 15 and 21 that are anticipated, with all of the dampers 29 being in their opened position when these maximum velocities prevail. As these velocities decrease, however, and approach the minimum velocity for fluidization of the discrete material one or more of the dampers associated with adjacent passageways 10 may be moved from the open to the restricting position thus preventing flow through these associated passageways resulting in increasing velocity of flow through the remaining passageways thus maintaining the velocities in these remaining passageways within the limits required for fluidization. Through this arrangement it will be evident that the range of gas velocity and air velocity with which the air heater may be operated is greatly increased over that which could be obtained without this control.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. The method of indirectly transferring heat from hot combustion gases to relatively cold air through a metallic wall comprising continuously passing said hot gases in unidirectional flow over one surface of said wall, continuously passing said air over the opposite surface of said wall in unidirectional flow, retaining a material in particle form in engagement with each of said surfaces, and fluidizing said material by passing the hot gases and air therethrough, and imparting heat from said hot gases to said cold air through said wall and progressively lowering the temperature of the combustion gases and raising the temperature of the air as each pass through the heat exchanger thereby substantially increasing the temperature of the air leaving the heat exchanger relative to that entering and substantially lowering the temperature of the hot combustion gases leaving the air heater relative to that entering.

2. The method of indirectly transferring heat from a heating gas to relatively cold gas to be heated through a metallic wall comprising continuously passing said heating gas over one surface of said wall in uniflow direction, continuously passing said gas to be heated over the opposite surface of said wall in uniflow direction, retaining a material in particle form in engagement with each of said surfaces, and fluidizing said material by passing said gases therethrough and imparting heat from said heating gas to said cold gas through said wall and progressively lowering the temperature of the heating gas and raising the temperature of the cold gas as each pass through the heat exchanger whereby the gas that is heated has a substantially higher temperature upon leaving the heat exchanger than it did as it entered the same and the heating gas has a substantially lower temperature as it leaves the heat exchanger than it did upon entering the same.

3. A gas to gas heat exchanger including a passageway through which hot gases are conveyed and a passageway through which a gas to be heated is conveyed, said passageways being separated by a common metallic wall which is contacted on one surface by the hot gases and on the other surface by the gases to be heated and through which heat is imparted from the hot gases to the gases to be heated, screen means spaced from and substantially parallel with said surfaces and forming therewith a chamber within which a discrete material is retained, said material being maintained in a fluidized condition by the passage of the respective gases therethrough.

4. A gas to air air heater comprising a plurality of juxtaposed passageways with immediately adjacent passageways having a common metallic wall, alternate passageways having hot gas passed therethrough with the remaining passageways having air passed therethrough, screens parallel with and spaced from the surfaces of the common walls forming therewith a chamber within which a discrete material is retained, with the screens in each passageway being so arranged so that a portion of the passage is unrestricted and with the discrete material maintained fluidized by the gas or air flowing through the respective passage.

References Cited in the file of this patent

UNITED STATES PATENTS

| | | |
|---|---|---|
| 1,833,666 | Watson et al. | Nov. 24, 1931 |
| 2,263,363 | Menshih | Nov. 18, 1941 |

FOREIGN PATENTS

| | | |
|---|---|---|
| 587,774 | Great Britain | May 6, 1947 |